United States Patent [19]

Traber

[11] Patent Number: 4,962,957
[45] Date of Patent: Oct. 16, 1990

[54] PICKUP TOOL WITH POSITIONAL LOCKING DEVICE

[76] Inventor: Arthur Traber, 888 Rancheros Dr., San Marcos, Calif. 92069

[21] Appl. No.: 422,753

[22] Filed: Oct. 17, 1989

[51] Int. Cl.$^5$ .............................................. B25J 1/00
[52] U.S. Cl. ................................... 294/19.1; 294/100
[58] Field of Search ............... 294/8.5, 11, 19.1–19.3, 294/22–24, 50.8, 50.9, 99.1, 100, 104, 115; 81/53.11, 53.12

[56] References Cited

U.S. PATENT DOCUMENTS

| | | | |
|---|---|---|---|
| 465,222 | 12/1891 | Ulbricht | 294/19.1 |
| 1,120,735 | 12/1914 | Moyer | 294/22 |
| 3,527,492 | 9/1970 | Hollis | 294/19.1 |
| 4,483,562 | 11/1984 | Schoolman | 294/19.1 |

*Primary Examiner*—Johnny D. Cherry
*Attorney, Agent, or Firm*—John J. Murphey

[57] ABSTRACT

In a single hand-actuated pick-up tool of the type comprising an elongated shaft terminating at spaced-apart upper and lower ends, a pair of spaced-apart, pick-up fingers extending from the lower end of the shaft including a pair of springs for biasing them apart, and a pair of ribbons including a handle with a finger-actuable trigger at the upper end, biased apart from the handle, for drawing the fingers together as the trigger is squeezed against the handle, the improvement of providing for the fingers to be able to close together and form locked configurations less than the fully-opened configuration including an arm extending from the trigger for reciprocal motion as a function of movement of the trigger, at least one notch formed in the arm adapted for engagement with a stop in the handle, a spring urging the arm into sliding contact with the stop as the trigger is moved and, a lever pivotally mounted at the upper shaft end for movement between a first unlocked position that permits the spring to retain the arm in contact with the stop and a second, unlock position where the arm is moved out of contact with the stop to permit full range of motion of the fingers from full open to full closed.

13 Claims, 2 Drawing Sheets

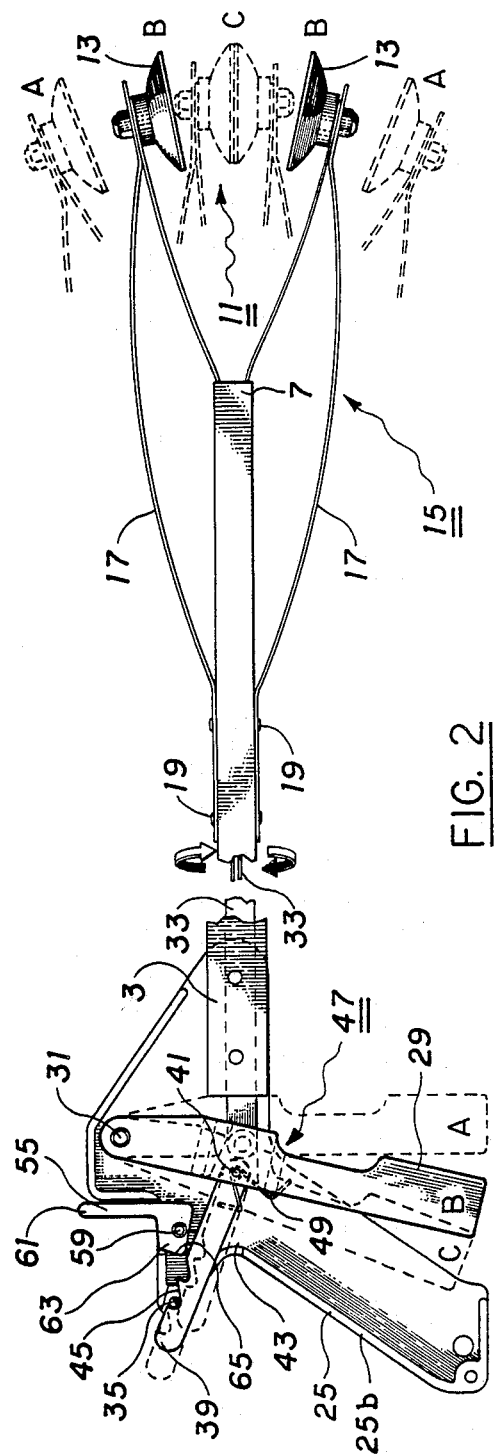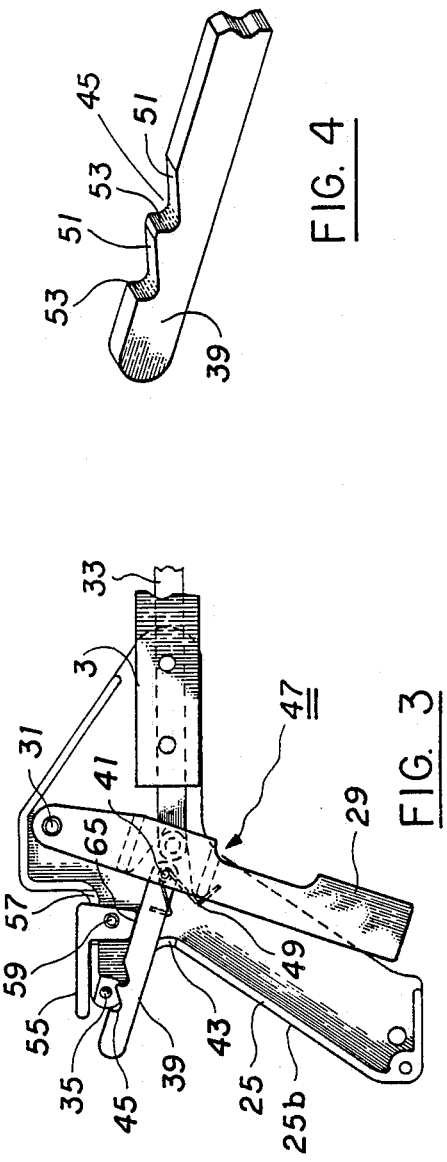

PICKUP TOOL WITH POSITIONAL LOCKING DEVICE

BACKGROUND OF THE INVENTION

1. Field of the Invention

This invention pertains to the field of hand tools. More particularly, this invention pertains to tools for undertaking manipulative operations spaced apart from the operator's hands for picking up and moving objects from one place to another; these tools are generally known as "reachers". More specifically, this invention pertains to reachers having means for locking the pickup fingers about an object for moving it from one location to another.

2. Description of the Prior Art

There are times and situations wherein an individual cannot directly use his or her hands to undertake a manipulative operation. Instances such as where house keys drop down through a grate, keys locked in a car, and a wallet dropped into a sewer are all instances where direct access to the article is prevented and some retrieval tool is needed. In addition, there are instances where an item is needed to be carefully moved from one location to another. Such an operation requires constant pressure applied to the manipulating tool against the object, so that it does not slip away. While young people may undertake and complete such an operation with ease, there are people, such as infirm, aged and even others who cannot maintain a constant grip on the tool handle with such a degree of consistency as to insure their grip will not loosen during the manipulation thereby allowing the item to fall from the grasp of the tool's pickup fingers. Simply picking up items has been the general subject of many reachers. For instance, U.S. Pat. No. 3,527,492 concerns a tool for use in picking up trash or other items, comprising an elongated shaft having a handle at the upper end and a pair of springs operated pick-up fingers at the lower end. Such tool is successful for picking up small items. In addition, U.S. Pat. 4,709,837 concerns a somewhat similar tool containing a shoe horn and an abutment attached to a movable portion at the lower end of the shaft for aiding a person in putting on and taking off their shoes. In both of these devices, however, the pressure exerted against the object to be captured by the tool comes directly from the pressure of the user's hand squeezing the trigger.

Particularly where sustained long-term grasping power is required, virtually all of the prior art has required, in turn, sustained hand-grasping power be developed at the handle and transmitted through mechanical means to the operative end of the reacher. Where such hand power is insufficient because of age, arthritis or other reasons, the prior art has not been successful in providing a reacher-type tool of significant locking power to overcome this loss of hand power.

SUMMARY OF THE INVENTION

This invention solves the aforementioned problems of the prior art in that it is a reacher for use in undertaking manipulative operations that require sustained grasping power at the operative end while the item is moved from one location to another. Such a result is achieved through mechanical advantage derived from an arm attached to the trigger portion of the upper end of the tool that engages a stop when the pickup fingers have reached a certain position inward from their original fully-opened position. The arm locks against a stop thereby allowing the fingers to be flexibly pressed against the object while the object is being moved by manipulation of the handle portion of the tool. Even further, the arm may be adapted to achieve more than one position of the fingers in locked configuration, such as where the tool may be adapted to have the fingers locked in a mid-open position and in another position such as fully closed. In this situation, then, items such as small bottles, glasses, and other delicate objects could be picked up and locked at the operative end of the tool by using that portion of the arm that will allow the fingers to be locked in the half-open or half-closed position while the fully-closed locked position may be used to pick up thin items such as papers and other documents. Also, this fully-closed position is the strongest position of the tool.

Further, because this is a single hand-actuated tool, the invention includes a novel lever, operably positioned above the handle portion, for manipulation by the thumb or other digit of the manipulating hand to provide this locking function to the tool and in another position, remove the locking function to allow the g fingers to be used as they were intended such as shown in U.S. Pat. 3,527,492.

This invention comprises an elongated shaft having a turned-out portion including a handle at the upper end that includes a finger-actuated trigger and a pair of spring-loaded, graspable fingers at the lower end and means between said upper end and lower end to cause the fingers to come together as a function of squeezing the trigger against the handle, and further includes means for causing the fingers to lock in a position inward from fully open, so that neither further squeezing by the handle nor other power is needed to retain the fingers in their locked configuration. This useful result is achieved by providing an arm containing notches along one side thereof for engagement with a stop situated in the handle, said arm being pivotally connected to said trigger and positioned to slide in reciprocal manner as a result of movement of the trigger. A lever is included to move the arm out of contact with the stop when the lockable function of the invention is to be removed from the pickup tool. When the lever is moved into an unlocked position, a bias means is provided to urge the sliding arm back into contact with the stop. Accordingly, the main object of this invention is a single hand-actuated pickup tool or reacher that provides significant, long-term, pick-up finger-locking strength in a position other than fully opened, without the need for sustained grasping power so as to be more useful in operations requiring continual clasping of an object or for use by persons who, due to infirmity, age or other reason, cannot sustain a significant grip against the handle while moving the object. The device is simple in construction, uses inexpensive plastic and aluminum materials and is priced to be affordable to a wide range of persons. These and other objects of the invention will become more apparent upon reading the description of the preferred embodiment along with the drawings attached hereto. The property rights claimed by the inventor within the scope of the monopoly granted under the United States patent laws may be gleaned from a fair reading of the claims that conclude this specification.

DESCRIPTION OF THE DRAWINGS

FIG. 2 is a vertical side partial elevational and sectional view of the upper end and lower end, rotated 90°, of the tool showing the different positions of the pickup fingers as a function of the position of the trigger.

FIG. 3 is the same as FIG. 2, showing the arm moved out of position by a lever. FIG. 4 is a side illustrative view of that part of the arm that provides the locking function to the invention.

DESCRIPTION OF THE PREFERRED EMBODIMENT

Figure 1:
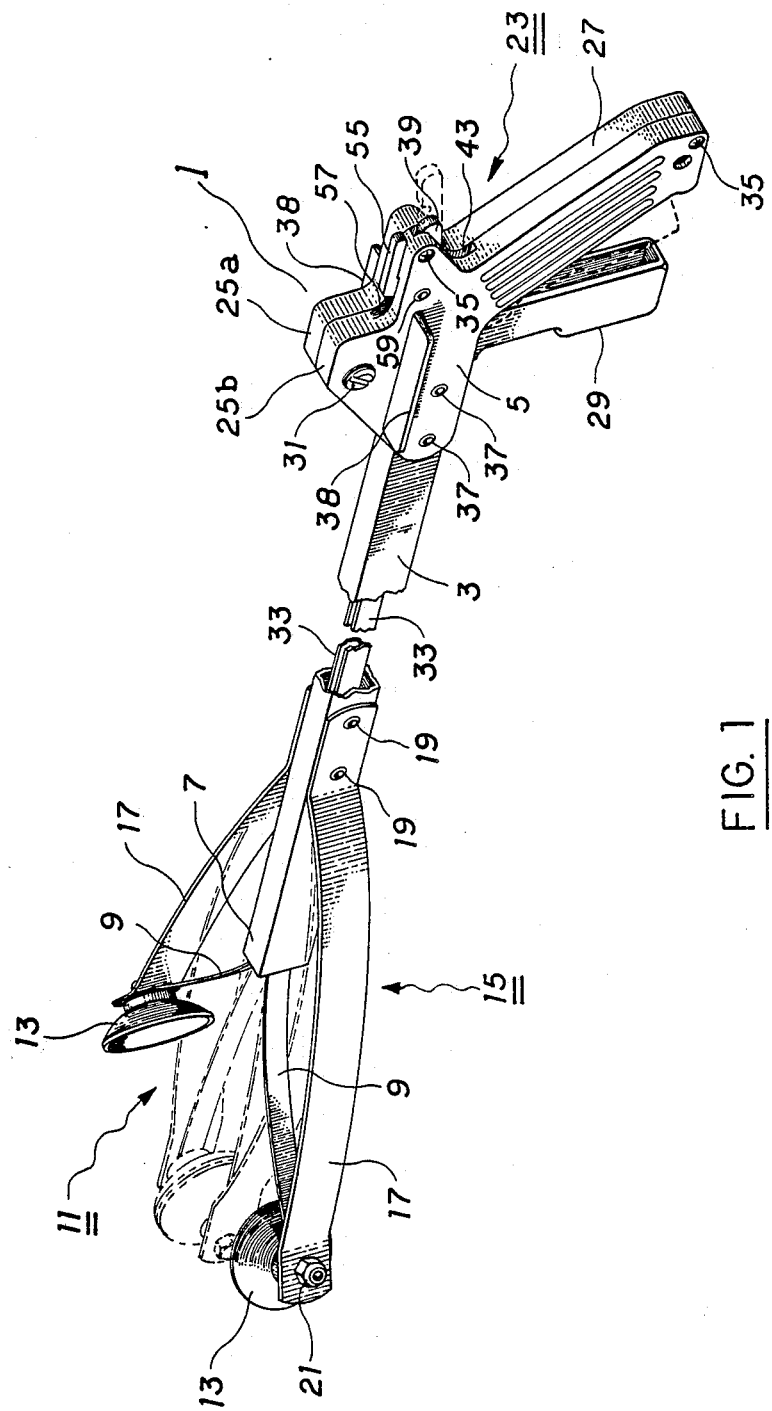
FIG. 1 is a triametric side-elevational general arrangement view of the preferred embodiment of this invention.

The preferred embodiment of this invention is shown in the figures wherein like elements are identified by like numerals throughout the four figures. In FIG. 1 is shown the single-hand actuated pickup tool 1 and comprises an elongated shaft 3, preferably hollow and made of a lightweight material such as aluminum, that terminates at spaced-apart upper end 5 and lower end 7. Lower end 7 is shown to comprise a pair of spaced-apart, pick-up fingers 9 terminated by grasping means 11 such as rubber suction cups 13 that extend from lower shaft end 7 and are held apart by first means 15 shown in FIG. 1 as a pair of spring metal arms 17 attached at one end to lower shaft end 7 by fastening means such as rivets 19 and attached at their other ends to rubber suction cups 13 through a small bolt and nut arrangement 21.

At upper end 5 is shown second means 23 that includes a turned-out portion 25 including a graspable handle 27, for grasping and manipulating tool 1, and further containing a finger actuable trigger 29 pivotally mounted by a pin 31 in turned-out portion 25 and connected through a pair of elongated metal or plastic tapes or ribbons 53 attached between trigger 29 and at the other end to each of the two suction cups 13. Turned-out portion 25 is preferably made in two halves 25a and 25b, that are joined along a mutual centerline and held together by screws or fastening pins 35 and joined to tool shaft 3 by rivets 37. A stiffening rib 38 is formed in each half to provide rigidity to upper end 5. As shown in FIG. 1, ribbons 33 preferably pass down through the hollow center portion of shaft 3 exiting shaft lower end 7 to join with rubber suction cups 13 at nut and bolt arrangement 21. The biasing action of spring arms 17 not only retains suction cups 13 in a spaced-apart, fully-open configuration but also biases ribbons 33 towards lower shaft end 7 thereby cocking trigger 29 in its forward-most position with respect to graspable handle 27 so as to provide, through pivot pin 31, a large swing radius for trigger 29.

As described thus far, squeezing trigger 29 against handle 27 or into a recess formed in handle 27 will cause ribbons 33 to be pulled up into upper shaft end 5 thereby drawing suction cups 13 together, as shown in FIG. 1 in dotted outline, so that too 1 may be used to grasp items between suction cups 13.

As shown more clearly in FIGS. 2 and 3, this invention constitutes an improvement wherein an arm 39 is pivotally attached to trigger 29 at a pivot pin 41, said arm extending outward therefrom for reciprocal or back and forth sliding motion as shown in FIGS. 1 and 2 in dotted outline as a function of squeezing trigger 29 against handle 27. Preferably, a notch or cut-out 43 is formed in the upper portion of turned-out portion 25, preferably above graspable handle 27 to accommodate the reciprocal movement of arm 39. At least one notch 45 is cut or formed in arm 39, preferably on the upper side or opposite graspable handle portion 27, and adapted to engage one of fastening pins 35, which acts as a stop, that is used to fasten portion halves 25a and 25b together.

A bias means 47 is provided to urge arm 39 into contact with fastening pin 35 during its reciprocal motion. As shown in FIGS. 2 and 3, bias means 47 is a torsion spring 49 wrapped about pin 41 with its free ends attached respectively to arm 39 and trigger 29. Notch 45 is adapted to engage fastening pin 35 when trigger 29 is squeezed towards handle 27 so as to lock suction cups 13 partially closed as shown in FIG. 2 at B. This permits the locking of suction cups 13 on both sides of an object that is to be picked up and moved by the manipulation of tool handle 27. The biasing nature of spring arms 17 allows suction cups 13 to vary slightly in separation distance when objects are encountered that are slightly wider than the locked distance between suction cups 13. A second notch 45 may also be formed on arm 39 as shown in FIGS. 2 and 3 such that arm 39 engages fastening-pin 35 when trigger 29 is fully squeezed against handle 27 as shown in FIG. 2 at C in dotted outline. In this situation, rubber cups 13 are brought fully together as shown in dotted lines in FIG. 2 at C. It is preferred, however, to have two notches 45 formed in arm 39 so that suction cups 13 can be locked intermediate between their open position at A and in their fully-closed position at C.

Notches 45 are uniquely formed in that they contain a rearwardly facing slanted notch wall 51 and a vertical forwardly facing wall 53, as shown in FIG. 4, so as to allow arm 39 to drop into, then slip out of, engagement with fastening pin 35 during squeezing of trigger 29. This is important where there are a plurality of notches 45 formed on arm 39, each representing a different lock position of fingers 9 to allow continued squeezing of trigger 29, in a ratchet-like effect, to advance suction cups 13 closer and closer to the item to be picked up. Upon reaching the tightest grip of cups 13 against the object to be captured by tool 1, arm 39, and thus the distance between cups 13, is retained in a non-slip configuration by the interaction of vertical notch walls 53 against fastening pin 35. When it is desired to remove the grip of cups 13 from the object, trigger 29 is squeezed just slightly to release the pressure on fastening pin 35 against rear notch wall 53 and the thumb or other digit of the hand holding tool 1 is used to lower arm 39 out of contact with pin 35.

A unique lever 55 is shown in FIGS. 2 and 3 to be pivotally mounted by a pin 59 forward of fastening-pin 35, in an accommodating notch 57 formed in turned-out portion half 25b, and comprises an outwardly extending positioning arm 61 for movement by the thumb or other digit of the hand holding and manipulating tool 1, and a delock arm 63 on which is formed a substantially flat delocking surface 65 for engagement with arm 39 to push it out of contact with pin 35. As shown in FIGS. 2 and 3, lever 55 may be rotated from a first unlocked position (FIG. 2) where delocking surface 65 is out of contact with arm 39, thereby allowing bias means 47 to urge arm 39 into contact with pin 35, to a second, locked position (FIG. 3) where delocking surface 65 is moved or rotated into contact with arm 39 and moving it out of contact with pin 35 thereby allowing trigger 29 to move freely through its full swing radius.

What is claimed is:

1. In a single-hand actuated pick-up tool of the type comprising an elongated shaft terminating at spaced-apart upper and lower ends, a pair of spaced-apart, pick-up fingers extending from said lower end of said shaft including first means for biasing said fingers apart to a first, fully-opened position, and second means, including a handle with a finger-actuable trigger at said upper end, said trigger biased apart from said handle, for drawing said fingers together to a second, fully-closed position, as said trigger is squeezed against said handle, the improvement comprising:
    (a) an arm extending from said trigger adapted for reciprocal motion as a function of movement of said trigger;
    (b) at least one notch formed in said arm adapted for engagement with a stop in said handle;
    (c) bias means urging said arm into sliding contact with said stop as said trigger is moved; and,
    (d) a lever pivotally mounted for movement between a first position, that permits said bias means to retain said arm in contact with said stop, for positioning said fingers in fixed configurations less than said first, fully-opened position, and a second position, that overcomes said bias means and moves said arm to a position spaced-apart from said stop to allow free, unhampered movement of said fingers from said first, fully-opened position to said second, fully-closed position as a function of said finger-actuable trigger.

2. The improvement of claim 1 wherein said arm is pivotally mounted and extends rearward from said handle.

3. The improvement of claim 1 wherein said handle includes a hand-gripping portion and said arm extends rearward and outward from said handle above said hand-gripping portion.

4. The improvement of claim 3 wherein said notch formed on said arm is located on the opposite side of said arm from said hand-gripping portion of said handle.

5. The improvement of claim 1 wherein said notch is formed on said arm at a location that allows said pickup fingers to b locked into a fixed position between the fully opened position an the fully closed position.

6. The improvement of claim 1 wherein said notch is formed on said arm at a location that allows said fingers to be locked into a fully closed position.

7. The improvement of claim 1 wherein said bias means includes a torsion spring attached between said arm and said trigger.

8. The improvement of claim 1 wherein said lever comprises a positioning arm, for manipulation by the thumb or digit of the hand holding said tool, and a delock arm extending at an angle therefrom, said delock arm forming a substantially flat delocking surface for contact with said arm to move said arm out of contact with said stop to allow full range of motion of said trigger 9. The improvement of claim 1 wherein said notch in said arm is bounded by a rearwardly facing slanted notch wall and a forwardly facing vertical wall to allow said arm to drop into, then slip out of engagement with said stop during squeezing of said trigger and to lock into place against said stop when said trigger is released.

10. The improvement of claim 1 wherein said shaft is hollow.

11. In a single-hand actuated pick-up tool of the type comprising an elongated hollow shaft terminating at spaced-apart upper and lower ends, a pair of spaced-apart pick-up fingers extending from said lower end of said shaft including first means for biasing said fingers apart to a first, fully-opened position, and second means, including a handle with a hand-gripping portion and with a finger-actuable trigger at said upper end, said trigger biased apart from said handle, for drawing said fingers together to a second, fully-closed position, as said trigger is squeezed against said handle, the improvement comprising:
    (a) an arm extending from said trigger, rearward and outward from said handle, above said hand-gripping portion thereof, adapted for reciprocal motion as a function of movement of said trigger;
    (b) at least one notch formed in said arm, positioned on the opposite side of said arm from said hand-gripping portion of said handle, adapted for engagement with a stop in said handle and formed on said arm at a location that allows said pick-up fingers to be locked into a fixed configuration less than said fully-opened position;
    (c) bias means, including a torsion spring attached between said arm and said trigger, for urging said arm into sliding contact with said stop as said trigger is moved; and,
    (d) a lever, comprising a positioning arm, for manipulation by the thumb or digit and a de-lock arm extending at an angle therefrom, said de-lock arm forming a substantially flat de-locking surface for contact with said arm, said lever mounted for movement between a first position, wherein said de-locking surface is out of contact with said arm to permit said bias means to urge said arm into contact with said stop, for positioning said fingers in fixed configurations less than said first, fully-opened position, and a second position, wherein said de-locking surface comes into contact with said arm and overcomes said bias means and moves said arm to a position spaced-apart from said stop to allow free, unhampered movement of said fingers from said first, fully-opened position to said second, fully-closed position as a function of said finger-actuable trigger.

12. The improvement of claim 11 wherein said notch in said arm is bounded by a rearwardly facing slanted notch wall and forwardly facing vertical wall to allow said arm to drop into, the slip out of engagement with said stop during squeezing of said trigger and to lock into place against said stop when said trigger is released.

13. The improvement of claim 10 including two notches t allow said pick-up fingers to be locked into partially-closed an fully-closed positions respectively.

* * * * *